United States Patent
Azizi et al.

(10) Patent No.: US 11,277,160 B2
(45) Date of Patent: Mar. 15, 2022

(54) TECHNOLOGIES FOR DYNAMIC WIRELESS NOISE MITIGATION USING ARTIFICIAL INTELLIGENCE

(71) Applicant: Intel Corporation, Santa Clara, CA (US)

(72) Inventors: Shahrnaz Azizi, Cupertino, CA (US); Vinod Kristem, San Jose, CA (US); Jie Gao, Sunnyvale, CA (US); Eduardo Alban, Hillsboro, OR (US); Kae-an Liu, Santa Clara, CA (US); Janardhan Koratikere Narayan, Fremont, CA (US); Xintian Lin, Palo Alto, CA (US); Ulun Karacaoglu, San Diego, CA (US); Atsuo Kuwahara, Portland, OR (US); Timothy F. Cox, Palo Alto, CA (US); Vallabhajosyula Srinivasa Somayazulu, Portland, OR (US); Maruti Gupta Hyde, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/841,022

(22) Filed: Apr. 6, 2020

(65) Prior Publication Data
US 2020/0235765 A1    Jul. 23, 2020

(51) Int. Cl.
*H03D 1/04* (2006.01)
*H04B 1/10* (2006.01)
*G06N 5/04* (2006.01)
*G06N 20/00* (2019.01)
*H04B 7/08* (2006.01)

(52) U.S. Cl.
CPC ............. *H04B 1/10* (2013.01); *G06N 5/04* (2013.01); *G06N 20/00* (2019.01); *H04B 7/0871* (2013.01)

(58) Field of Classification Search
CPC ........ H04B 1/10; H04B 7/0871; G06N 20/00; G06N 5/04
USPC ................................ 375/346, 316, 295, 219
See application file for complete search history.

(56) References Cited

U.S. PATENT DOCUMENTS

| | | | | |
|---|---|---|---|---|
| 10,446,170 | B1 * | 10/2019 | Chen | G10L 21/0208 |
| 2009/0066677 | A1 * | 3/2009 | Kim | G06F 3/147 |
| | | | | 345/204 |
| 2010/0296561 | A1 * | 11/2010 | Yang | H04L 27/2649 |
| | | | | 375/222 |

(Continued)

*Primary Examiner* — Zewdu A Kassa
(74) *Attorney, Agent, or Firm* — Hanley, Flight & Zimmerman LLC

(57) ABSTRACT

Technologies for dynamic wireless noise mitigation include a computing device having a wireless modem and one or more antennas. The computing device activates one or more components of the computing device, monitors platform activity, and measures wireless noise received by the antennas. The computing device trains a noise prediction model based on the platform activity and the measured noise. The computing device may monitor platform activity and predict a noise prediction with the noise prediction model based on the monitored activity. The computing device may mitigate wireless noise received by the wireless antennas based on the noise prediction. The computing device may provide the noise prediction to the wireless modem. Other embodiments are described and claimed.

28 Claims, 3 Drawing Sheets

(56) References Cited

U.S. PATENT DOCUMENTS

| | | | |
|---|---|---|---|
| 2013/0143494 A1* | 6/2013 | Chen | H04B 7/0874 455/41.2 |
| 2018/0034532 A1* | 2/2018 | Wu | H04B 7/08 |

* cited by examiner

TECHNOLOGIES FOR DYNAMIC WIRELESS NOISE MITIGATION USING ARTIFICIAL INTELLIGENCE

BACKGROUND

Typical computing devices such as laptops, tablets, and convertible devices include one or more wireless radios, including cellular radios, Wi-Fi® radios, or other wireless radios. Unintentional electromagnetic interference can be picked up by wireless receivers as noise, which may negatively impact wireless network throughput or other user-visible performance. As device form factors become physically smaller and components operate at higher frequency, platform noise from electromagnetic interference tends to increase. Typically, platform designers attempt to mitigate platform noise at design time, for example through careful antenna placement and routing, shielding, or other design considerations.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
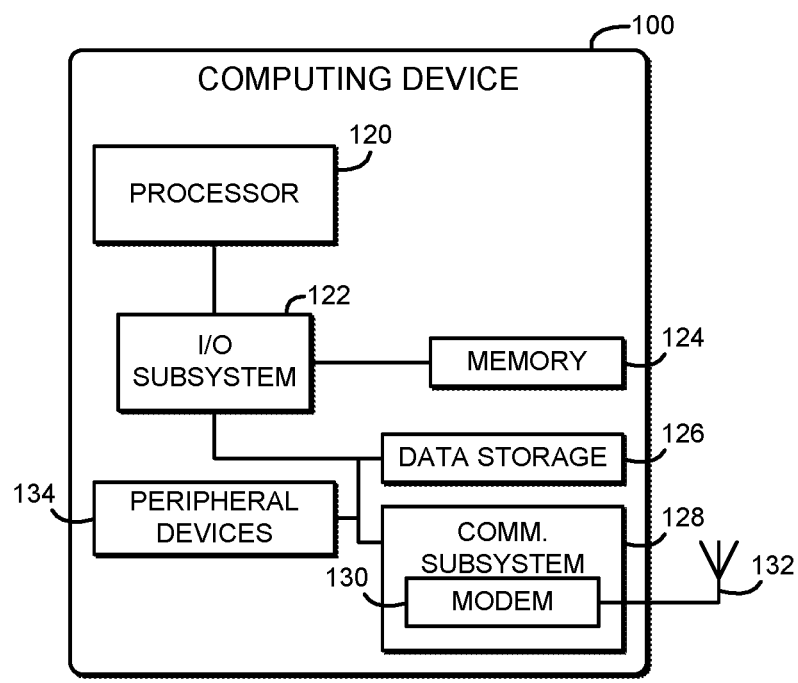
FIG. 1 is a simplified block diagram of at least one embodiment of a computing device for dynamic wireless noise mitigation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for dynamic wireless noise mitigation is shown. In use, as described below, the computing device 100 monitors platform activity including component utilization levels, activated components, active applications, and other platform activity, and uses a trained machine learning model to predict radio frequency noise based on the monitored platform activity. The machine learning model may be trained by the computing device 100, for example during a testing process in which various components of the computing device 100 are exercised. The computing device 100 uses the noise prediction to mitigate radio frequency noise received by one or more wireless antennas of the computing device 100. For example, the noise prediction may be provided to a wireless modem or other wireless device, which may mitigate noise using a noise whitener, notch filter, or other adaptive noise mitigation techniques. As another example, the prediction may be used to schedule platform activity (e.g., hardware components, applications, or network traffic) to reduce wireless interference. Thus, the by performing dynamic noise mitigation, the computing device 100 may provide improved wireless performance (e.g., lower latency and improved throughput) as compared to conventional systems without dynamic noise mitigation. In particular, the computing device 100 may perform fully adaptive dynamic noise mitigation, which may improve wireless performance compared to reactive techniques such as adjusting frequency based on the active Wi-Fi channel reported by the wireless device. Further, the computing device 100 may provide improved wireless performance in frequency bands (e.g. 6-7 GHz) that may include interference from certain high-speed double-data rate (DDR) memory devices.

The computing device 100 may be embodied as any type of device capable of performing the functions described herein. For example, the computing device 100 may be embodied as, without limitation, a computer, a laptop computer, a notebook computer, a tablet computer, a 2-in-1 combination computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 122, a memory 124, and a data storage device 126. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 124 may be directly coupled to the processor 120, for example via an integrated memory controller hub. Additionally, in some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 128, which may be embodied as any communication circuit, device, or collection thereof, capable of enabling communications between the computing device 100 and other remote devices over a computer network (not shown). The communications subsystem 128 may be configured to use any one or more communication technology (e.g., wired or wireless communications) and associated protocols (e.g., Ethernet, Bluetooth®, WiFi®, WiMAX, 3G, 4G LTE, 5G, etc.) to effect such communication.

As shown, the communications subsystem 128 includes one or more wireless modems 130. Each modem 130 may be embodied as any controller, core, circuit or other component that enables wireless radio communication between the computing device 100 and other remote devices. For example, the modem 130 may be embodied as a wireless LAN modem (e.g., a Wi-Fi modem), a cellular modem (e.g., a 3G modem, 4G LTE modem, 5G modem, or other cellular modem), or other wireless modem. Each modem 130 is coupled to one or more wireless antennas 132, for example in a multiple-in, multiple-out (MIMO), single-in, single-out (SISO), or other configuration. Each antenna 132 is configured to send and receive wireless radio signals, and may be embodied as an internal antenna (e.g., included within a chassis or other frame of the computing device 100) or an external antenna.

As shown, the computing device 100 may further include one or more peripheral devices 134. The peripheral devices 134 may include any number of additional input/output devices, interface devices, and/or other peripheral devices. For example, in some embodiments, the peripheral devices 134 may include a display, camera, touch screen, graphics circuitry, keyboard, mouse, speaker system, microphone, network interface, and/or other input/output devices, interface devices, and/or peripheral devices.

Figure 2:
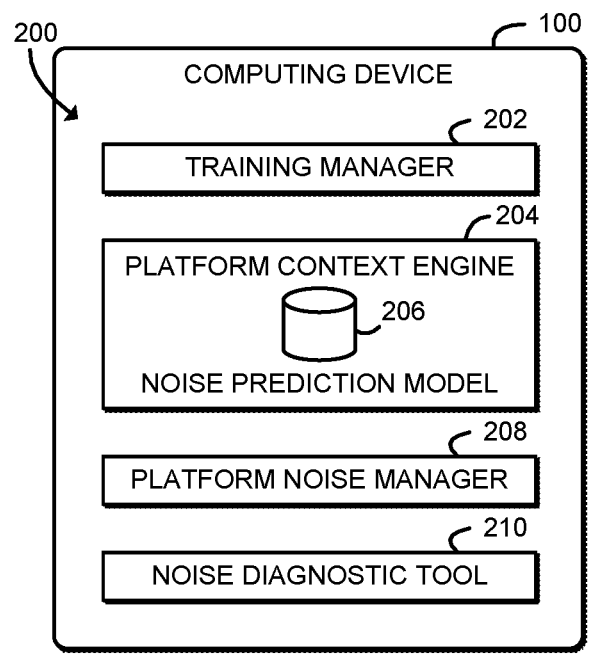
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes a training manager 202, a platform context engine 204, a platform noise manager 208, and a noise diagnostic tool 210. The various components of the environment 200 may be embodied as hardware, firmware, software, or a combination thereof. As such, in some embodiments, one or more of the components of the environment 200 may be embodied as circuitry or collection of electrical devices (e.g., training manager circuitry 202, platform context engine circuitry 204, platform noise manager circuitry 208, and/or noise diagnostic tool circuitry 210). It should be appreciated that, in such embodiments, one or more of the training manager circuitry 202, the platform context engine circuitry 204, the platform noise manager circuitry 208, and/or the noise diagnostic tool circuitry 210 may form a portion of the processor 120, the I/O subsystem 122, the wireless modem 130, and/or other components of the computing device 100. Additionally, in some embodiments, one or more of the illustrative components may form a portion of another component and/or one or more of the illustrative components may be independent of one another.

The training manager 202 is configured to activate one or more components of the computing device 100. Such components may include, for example, the processor 120, the memory 124, a graphics processing unit (GPU), a peripheral device (e.g., a camera), or other component of the computing device 100. Activating the one or more components may include executing a predetermined application of the computing device 100.

The noise diagnostic tool 210 is configured to measure radio frequency noise received by one or more wireless antennas 132 with the associated wireless modem 130. Measuring the radio frequency noise may include identify an affected antenna 132 of the one or more wireless antennas 132 associated with the radio frequency noise, determining a spectrum of the radio frequency noise, or determining a covariance matrix for the radio frequency noise.

The platform context engine 204 is configured to monitor platform activity of the computing device 100. The platform context engine 204 may monitor platform activity in response to activation of the one or more components as described above or otherwise in use. Monitoring the platform activity may include reading a performance counter of the computing device 100, such as a processor 120 performance counter, a memory 124 performance counter, or a GPU performance counter. Monitoring the platform activity may include reading one or more statistics of the wireless modem 130. Monitoring the platform activity may include identifying an active application.

The platform context engine 204 is further configured to train a noise prediction model 206 based on the platform activity and the radio frequency noise. The noise prediction model 206 is a machine learning model configured to predict radio frequency noise received by the one or more wireless antennas 132. The platform context engine 204 is further configured to predict a radio frequency noise prediction based on the platform activity with the noise prediction model 206. In some embodiments, the noise prediction model 206 may predict radio frequency noise based on saved data bases, tables, or previously measured data. Predicting the radio frequency noise prediction may include predicting an affected antenna 132 of the one or more wireless antennas 132, predicting a noise profile for the one or more wireless antennas 132, or predicting a covariance matrix for the noise received by the one or more wireless antennas 132. In some embodiments, predicting the radio frequency noise prediction may include predicting radio frequency noise levels at various locations within the computing device 100, for example to predict a location to position one or more wireless antennas 132 within the computing device 100 having a lower radio frequency noise level compared to other possible locations within the computing device 100.

The platform noise manager 208 is configured to mitigate radio frequency noise received by one or more wireless antennas 132 based on the radio frequency noise prediction. Mitigating the radio frequency noise received by the one or more wireless antennas 132 may include providing the radio frequency noise prediction to the associated wireless modem 130. In some embodiments, mitigating the radio frequency noise further includes whitening the radio frequency noise by the wireless modem 130 with the covariance matrix predicted as described above, and/or using the predicted information in combination with noise estimations performed by the wireless modem 130. In some embodiments, mitigating the radio frequency noise further includes changing a mode of operation of the wireless modem 130 based on the noise profile predicted as described above, for example by changing from a multiple in, multiple out (MIMO) mode to a single in, single out (SISO) mode. In some embodiments, mitigating the radio frequency noise may include applying a frequency filtering operation such as a notch filter to remove the predicted noise. In some embodiments, mitigating the radio frequency noise may include adjusting a clock frequency of the computing device 100. In some embodiments, mitigating the radio frequency noise may include adjusting an application priority to avoid wireless interference.

Figure 3:
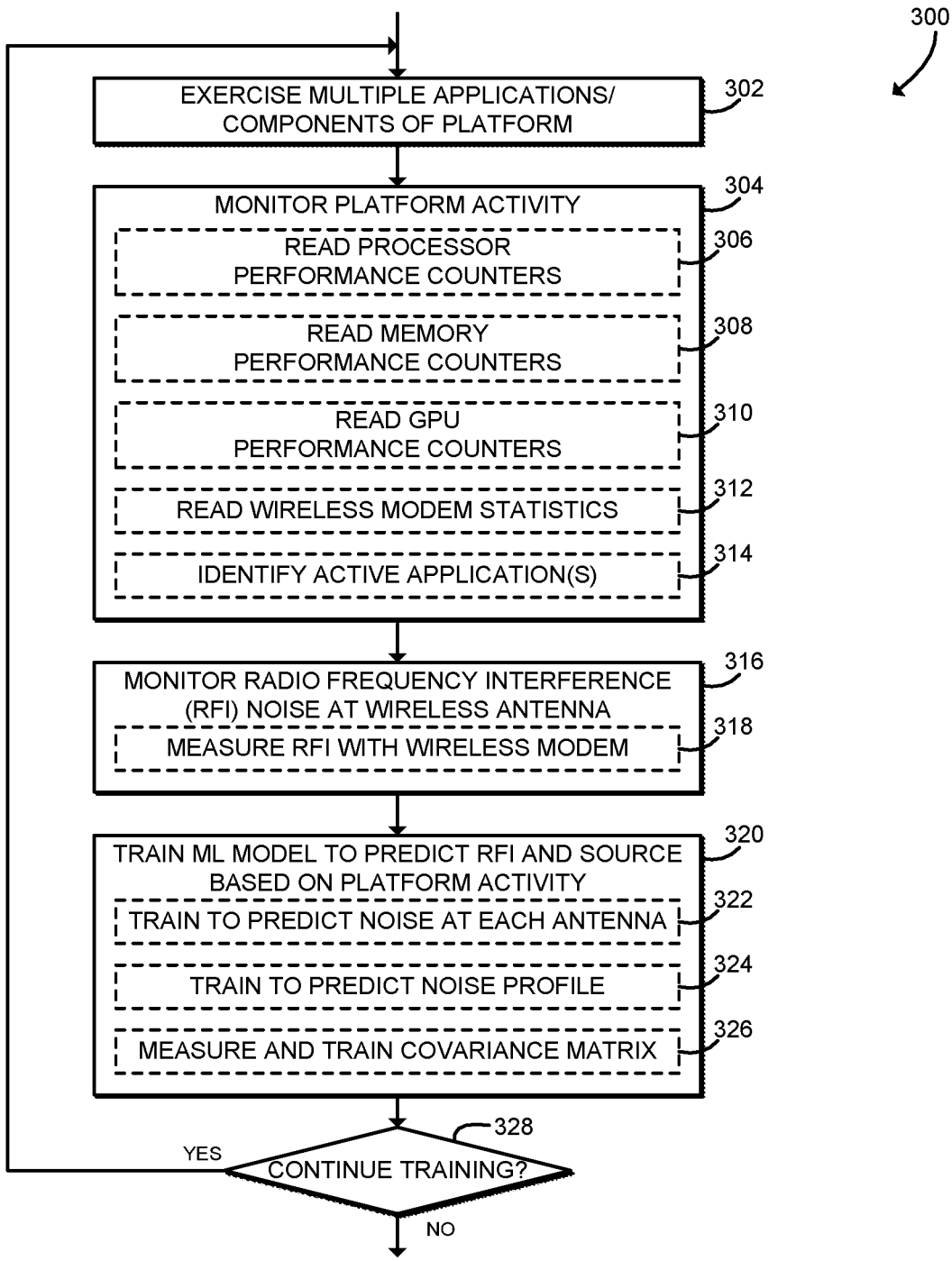
FIG. 3 is a simplified flow diagram of at least one embodiment of a method for training a noise prediction model that may be executed by the computing device of FIGS. 1 and 2.

Referring now to FIG. 3, in use, the computing device 100 may execute a method 300 for training a noise prediction model. It should be appreciated that, in some embodiments, the operations of the method 300 may be performed by one or more components of the environment 200 of the computing device 100 as shown in FIG. 2. The method 300 begins in block 302, in which the computing device 100 exercises multiple applications and/or platform components of the computing device 100. Each executed application may activate or otherwise exercise a different combination of platform components. For example, certain applications may generate memory 124 accesses (e.g., activity on a double-data rate (DDR) memory bus). Other applications may generate I/O bus traffic (e.g., PCI express bus traffic or other traffic). Other applications (e.g., games or other graphics-intensive applications) may activate a graphics processing unit (GPU) of the computing device 100. Other applications (e.g., videoconferencing applications) may activate certain peripheral devices 134 or other components of the computing device 100 (e.g., video cameras, microphones, or other I/O devices). The exercised applications and/or components may be pre-scripted or otherwise standardized to allow for repeatability and predictable test coverage. For example, the computing device 100 may execute one or more application scripts, benchmarks, or other scripted workloads. The noise prediction training may be performed with the computing device 100 in a shielded room or other location to reduce interference from external sources.

In block 304, the computing device 100 monitors platform activity of the computing device 100. The computing device 100 may use any technique to measure or otherwise determine current component utilization, frequency, voltage, power, or other performance characteristics of the computing device 100 that are correlated to platform noise. For example, the computing device 100 may read one or more performance counters or other registers that track performance or activation of various components of the computing device 100. By reading registers directly, the computing device 100 may monitor platform activity independently of any operating system of the computing device 100.

In some embodiments, in block 306 the computing device 100 may read one or more performance counters of the processor 120, the wireless modem 130, or other components of the computing device 100. For example, the computing device 100 may read one or more performance counters to compare user processor time (e.g., time or cycles spent executing user applications) to idle processor time or total processor time. A higher percentage of user processor time may indicate a processor-intensive workload, which may be correlated to certain platform noise. In some embodiments, in block 308 the computing device 100 may read one or more performance counters associated with the memory 124. For example, the computing device 100 may read one or more performance counters to determine the number of memory pages output or repurposed per second. In some embodiments, the computing device 100 may read performance counters for other subsystems that are related to memory-intense workloads. For example, the computing device 100 may read one or more performance counters to determine average bytes read from the data storage device 126, disk queue length for the data storage device 126, or other data storage performance counters. Those performance counters may be established by the processor 120, the I/O subsystem 122, or other components of the computing device 100 (e.g., by an uncore of the processor 120 or other component). In some embodiments, in block 310 the computing device 100 may read one or more performance counters associated with a GPU of the computing device 100. For example, the computing device 100 may read one or more performance counters to determine utilization, memory faults, cache activity, processor C1 time, or other performance statistics of the GPU. In some embodiments, in block 312 the computing device 100 may read one or more statistics from the wireless modem 130. For example, the computing device 100 may determine a number of false alarms, a number of received-packet failures, a number of retransmissions, or other statistics that may indicate that noise at the platform is causing issues with receiving packets or receiving acknowledgements to successful transmissions.

In some embodiments, in block 314 the computing device 100 the computing device 100 may identify one or more active applications of the computing device 100. For example, the computing device 100 may identify the name, type, or other characteristic of each active application. Each active application may activate one or more associated components of the computing device 100. For example, a videoconferencing application may activate a camera, and as another example, a game may activate the GPU.

In block 316, the computing device 100 measures radio frequency interference (RFI) noise at the wireless antenna(s) 132 of the computing device 100. In some embodiments, the computing device 100 may measure noise during normal operation of the modem 130. In some embodiments, in block 318 the computing device 100 may measure the RFI noise using the wireless modem 130 associated with each wireless antenna 132. The computing device 100 may, for example, measure interference received by the wireless antenna 132 in one or more signal bands used by the corresponding modem 130. Operation of the wireless modem 130 may be dedicated to noise measurements. The computing device 100 may measure the RFI noise using a Noise Diagnostic Tool (NDT), Noise Profile Tool, or other diagnostic tool associated with the wireless modem 130. Measuring noise using the wireless modem 130 itself may measure noise exactly as seen by the wireless modem 130, for example, at the same location as each wireless antenna 132 of the computing device 100. The computing device 100 may capture a frequency domain noise profile or other noise profile of the platform noise received by the wireless antenna 132. Additionally or alternatively, in some embodiments the test procedure described herein may measure the RFI noise using a spectrum analyzer or other external tool to capture measured noise data. Measured noise data captured by a spectrum analyzer or other external device may be transferred to the computing device 100 and, for example, saved in the memory 124 and/or data storage device 126.

In block 320, the computing device 100 trains the noise prediction model 206 to predict the RFI noise and source of the noise based on the monitored platform activity as well as prior training and information obtained by noise measurements. The noise prediction model 206 is a machine learning model, such as a deep neural network, a convolutional neural network, or other learning network. The noise prediction model 206 thus may include one or more fully connected layers, convolutional layers, hidden layers, or other machine learning components. In some embodiments, the noise prediction model 206 may also include model based data and saved data; for example, a look-up table for predicted noise power based on previously measured data. The noise prediction model 206 may be trained to classify a source of the noise based on monitored platform activity using the particular exercised components of the computing device 100. For example, the noise prediction model 206 may be trained to recognize noise generated by DDR memory, by a video camera, or by another active component of the computing device 100. The noise prediction model 206 may be trained using a gradient descent algorithm or other training algorithm. Inputs to the noise prediction model 206 may include the performance counters, statistics from the wireless modem 130 or other indication of platform activity determined as described above in connection with block 304, including the identity, type, or other attributes of the applications executed by the computing device 100.

In some embodiments, in block 322 the computing device 100 may train the noise prediction model 206 to predict noise experienced at each antenna 132 of the computing device 100. Each antenna 132 may receive a different RFI noise profile depending on the activity performed by the computing device 100. For example, certain DDR memory buses or other DDR memory components may generate harmonics or other noise in a 6-7 GHz frequency band, which may be received by a Wi-Fi antenna 132. As another example, activating a particular component (e.g., transmitting video generated by a camera over a peripheral bus) may generate interference in one or more antennas 132 that are physically near the activated component and/or associated communication links.

In some embodiments, in block 324 the computing device 100 may train the noise prediction model 206 to predict a noise profile for the RFI noise. The noise profile may include, for example, a noise amplitude, a power spectrum, a frequency domain analysis, or another noise signature received by the antenna 132. The computing device 100 may train noise profiles independently for each antenna 132 in the computing device 100.

In some embodiments, in block 326 the computing device 100 may train the noise prediction model 206 to predict a covariance matrix for the RFI noise. As described further below, the covariance matrix may be used with a noise whitening process in order to mitigate RFI noise received at the computing device 100.

In block 328, the computing device 100 determines whether to continue training the noise prediction model 206. The computing device 100 may determine, for example, whether additional applications or components of the computing device 100 remain to be exercised. As another example, the computing device 100 may determine whether the noise prediction model 206 has achieved a predetermined accuracy or is otherwise sufficiently trained. If the computing device 100 determines to continue training, the method 300 loops back to block 302. If the computing device 100 determines not to continue training, the method 300 is completed. The computing device 100 may use the noise prediction model 206 to dynamically mitigate platform noise as described below in connection with FIG. 4. Additionally or alternatively, in some embodiments, the trained noise prediction model 206 may be distributed to other computing devices 100 (e.g., other computing devices 100 of the same model or otherwise similar computing devices) for use with the method 400 for dynamic noise mitigation.

Figure 4:
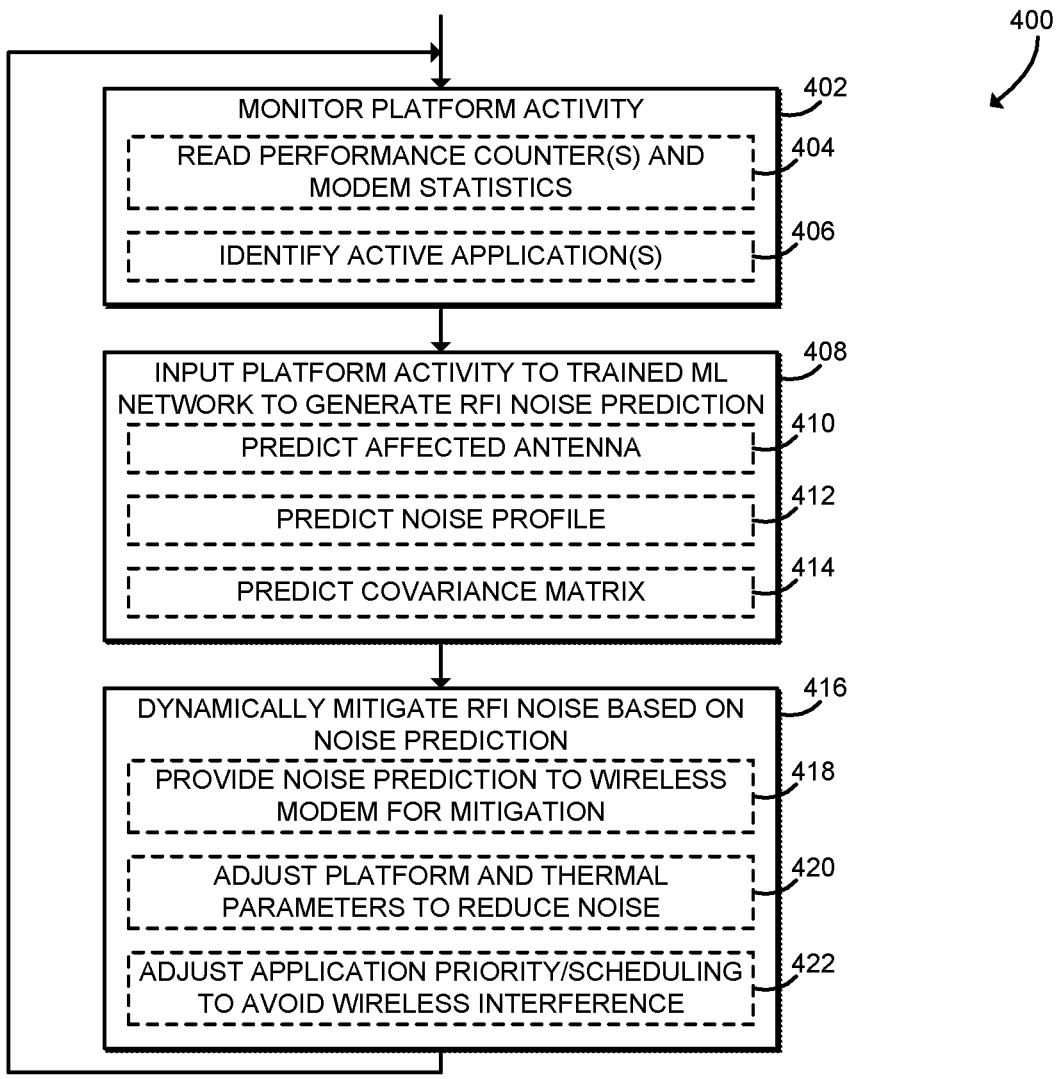
FIG. 4 is a simplified flow diagram of at least one embodiment of a method for dynamic wireless noise mitigation with a noise prediction model that may be executed by the computing device of FIGS. 1 and 2.

Referring now to FIG. 4, in use, the computing device 100 may execute a method 400 for dynamic wireless noise mitigation. It should be appreciated that, in some embodiments, the operations of the method 400 may be performed by one or more components of the environment 200 of the computing device 100 as shown in FIG. 2. The method 400 begins in block 402, in which the computing device 100 monitors platform activity of the computing device 100. In particular, the computing device 100 may monitor the same indications of platform activity that are measured during training of the noise prediction model 206 as described above in connection with FIG. 3, such as performance counters and/or active applications. As described above, the computing device 100 may use any technique to measure or otherwise determine current component utilization, frequency, voltage, power, or other performance characteristics of the computing device 100 that are correlated to platform noise. In some embodiments, in block 404 the computing device 100 may read one or more performance counters of the computing device 100. For example, as described above in connection with FIG. 3, the computing device 100 may read one or more performance counters or other statistics associated with the processor 120, the memory 124, the GPU, the wireless modem 130, or other components of the computing device 100. In some embodiments, in block 406, the computing device 100 may identify one or more active applications of the computing device 100. For example, the computing device 100 may identify the name, type, or other characteristic of each active application. As described above, each active application may activate one or more associated components of the computing device 100. For example, a videoconferencing application may activate a camera, and as another example, a game may activate the GPU.

In block 408, the computing device 100 inputs data indicative of the monitored platform activity to the noise prediction model 206 to generate an RFI noise prediction. The noise prediction model 206 is previously trained as described above in connection with FIG. 3. Inputs to the noise prediction model 206 may include data read from performance counters or other indication of platform activity as well as the identity, type, or other attributes of the applications executed by the computing device 100 determined as described above in connection with block 402. The noise prediction generated by the noise prediction model 206 may include attributes of predicted RFI noise at one or more antennas 132 of the computing device as well as a predicted source or sources of the RFI noise.

In block 410, the computing device 100 may predict one or more antennas 132 affected by RFI noise based on the current platform activity. In some embodiments, in block 412, the computing device 100 may predict a noise profile for RFI noise. As described above, the noise profile may include, for example, a noise amplitude, a power spectrum, a frequency domain analysis, or another noise signature received by the antenna 132. The predicted noise profile may include a narrowband estimation of RFI noise. In some embodiments, in block 414, the computing device 100 may predict a covariance matrix for the RFI noise. As described further below, the covariance matrix may be used with a noise whitening process in order to mitigate RFI noise received at the computing device 100.

In block 416, the computing device 100 dynamically mitigates RFI noise based on the noise prediction. The computing device 100 may adjust one or more platform parameters in order to reduce RFI noise generated by the platform and/or received by the antenna 132. In some embodiments, in block 418 the computing device 100 may provide the noise prediction or other data based on the noise prediction to the wireless modem 130. For example, the computing device 100 may provide a predicted noise profile, predicted covariance matrix, or other predicted noise data to the modem 130. The wireless modem 130 may use the noise prediction to mitigate noise. For example, the wireless modem 130 may use the predicted covariance matrix with a time-domain noise whitening module to whiten noise received by the antenna 132. As another example, the wireless modem 130 may use a list of subbands/subcarriers with predicted noise (e.g., a frequency domain noise profile) with a frequency domain noise whitening module to whiten the noise received by the antenna 132. Whitening the noise may allow for the modem 130 to improve the received signal to noise ratio. As another example, the modem 130 may use the noise prediction including a narrowband noise estimation to adaptively select wireless channels, activate adaptive notch filtering, or otherwise avoid predicted noise. As another example, the modem 130 may change operating mode to avoid predicted noise. For example, the modem 130 may change from a MIMO operating mode that uses multiple antennas 132 to a SISO mode that uses a single antenna 132 when noise is predicted for a particular antenna 132.

In some embodiments, in block 420 the computing device 100 may adjust platform and thermal parameters to avoid generating RFI noise and/or to adjust the frequency of RFI noise. For example, the computing device 100 may adjust the operating frequency of one or more components (e.g., memory buses, I/O buses, or other communication links) in order to avoid harmonics in a particular frequency band. Continuing that example, in an illustrative embodiment, the computing device 100 may reduce a frequency of a DDR memory bus in order to move a harmonic frequency out of a Wi-Fi frequency band (e.g., 6-7 GHz). As another example, the computing device 100 may deactivate, reduce power, or otherwise adjust parameters for one or more components identified as a predicted source of the RFI noise (e.g., a DDR memory, a video camera, or other predicted source).

In some embodiments, in block 422 the computing device 100 may adjust application priority/scheduling to avoid interference. The computing device 100 may adjust priority or scheduling using an operating system scheduler, using a network quality of service (QoS) scheduler, or other scheduling mechanism. To avoid interference, the computing device 100 may avoid scheduling certain applications that use wireless communication during periods of predicted interference. For example, the computing device 100 may avoid scheduling background network updates and other background tasks when noise is predicted. As another example, the computing device 100 may prioritize certain applications during periods of predicted noise. Continuing that example, the computing device 100 may prioritize interactive network applications (e.g., videoconferencing applications) over other network applications (e.g., email or background transfers) when noise is predicted so that user-visible effects of noise (e.g., reduced bandwidth or increased latency) are reduced. After dynamically mitigating the predicted noise, the method 400 loops back to block 402 to continue monitoring platform activity. Although illustrated in FIG. 4 as being performed sequentially, it should be understood that operations of the method 400 may be performed in parallel or in any other order. For example, in some embodiments the wireless modem 130 may continue to perform noise mitigation while the computing device 100 continues to monitor platform activity and predict noise to adjust mitigation techniques as needed.

Further, although illustrated in FIGS. 3-4 as using the noise prediction model 206 for dynamic noise mitigation, it should be understood that in some embodiments, the noise prediction model 206 may also be used for other types of noise mitigation. For example, in some embodiments, the noise prediction model 206 may be trained as described in connection with FIG. 3 and used to determine whether design-time noise mitigation is effective. In such embodiments, predicted noise would decrease in response to effective design changes (e.g., changes in shielding, cable routing, or other design changes). Additionally or alternatively, in some embodiments the noise prediction model 206 may be used to identify predicted noise sources, and design-time noise mitigation may be applied to the predicted noise sources.

It should be appreciated that, in some embodiments, the methods 300 and/or 400 may be embodied as various instructions stored on a computer-readable media, which may be executed by the processor 120, the I/O subsystem 122, and/or other components of the computing device 100 to cause the computing device 100 to perform the respective method 300 and/or 400 respectively. The computer-readable media may be embodied as any type of media capable of being read by the computing device 100 including, but not limited to, the memory 124, the data storage device 126, firmware devices, other memory or data storage devices of the computing device 100, portable media readable by a peripheral device 134 of the computing device 100, and/or other media.

EXAMPLES

Illustrative examples of the technologies disclosed herein are provided below. An embodiment of the technologies may include any one or more, and any combination of, the examples described below.

Example 1 includes a computing device for managing platform noise, the computing device comprising a wireless modem coupled to one or more wireless antennas; a platform context engine to (i) monitor platform activity of the computing device and (ii) predict a radio frequency noise prediction based on the platform activity with a noise prediction model, wherein the noise prediction model comprises a trained machine learning model; and a platform noise manager to mitigate radio frequency noise received by one or more wireless antennas of the computing device based on the radio frequency noise prediction.

Example 2 includes the subject matter of Example 1, and wherein to monitor the platform activity comprises to read a performance counter of the computing device.

Example 3 includes the subject matter of any of Examples 1 and 2, and wherein the performance counter comprises a processor performance counter, a memory performance counter, or a graphics processing unit performance counter.

Example 4 includes the subject matter of any of Examples 1-3, and wherein to monitor the platform activity comprises to identify an active application.

Example 5 includes the subject matter of any of Examples 1-4, and wherein to predict the radio frequency noise prediction comprises to predict an affected antenna of the one or more wireless antennas of the computing device.

Example 6 includes the subject matter of any of Examples 1-5, and wherein to predict the radio frequency noise prediction further comprises to predict a wireless antenna location within the computing device for the one or more wireless antennas having a lower radio frequency noise level.

Example 7 includes the subject matter of any of Examples 1-6, and wherein to predict the radio frequency noise prediction comprises to predict a noise profile for the one or more wireless antennas.

Example 8 includes the subject matter of any of Examples 1-7, and wherein to predict the radio frequency noise prediction comprises to predict a covariance matrix for the noise received by a plurality of wireless antennas.

Example 9 includes the subject matter of any of Examples 1-8, and wherein to mitigate the radio frequency noise received by the one or more wireless antennas comprises to provide the radio frequency noise prediction to the wireless modem of the computing device.

Example 10 includes the subject matter of any of Examples 1-9, and wherein to predict the radio frequency noise prediction comprises to predict a covariance matrix for the noise received by a plurality of wireless antennas; and to mitigate the radio frequency noise further comprises to whiten the radio frequency noise by the wireless modem with the covariance matrix.

Example 11 includes the subject matter of any of Examples 1-10, and wherein to predict the radio frequency noise prediction comprises to predict a noise profile for the one or more wireless antennas; and to mitigate the radio frequency noise further comprises to change a mode of operation of the wireless modem based on the noise profile.

Example 12 includes the subject matter of any of Examples 1-11, and wherein to change the mode of operation comprises to change from a multiple in, multiple out (MIMO) mode to a single in, single out (SISO) mode.

Example 13 includes the subject matter of any of Examples 1-12, and wherein to mitigate the radio frequency noise comprises to adjust a clock frequency of a component of the computing device.

Example 14 includes the subject matter of any of Examples 1-13, and wherein to mitigate the radio frequency noise comprises to adjust an application priority to avoid wireless interference.

Example 15 includes a computing device for platform noise training, the computing device comprising a wireless modem coupled to one or more wireless antennas; a training manager to activate one or more components of the computing device; a platform context engine to monitor platform activity of the computing device in response to activation of the one or more components; and a noise diagnostic tool to measure, with the wireless modem of the computing device, radio frequency noise received by the one or more wireless antennas of the computing device; wherein the platform context engine is further to train a noise prediction model based on the platform activity and the radio frequency noise, wherein the noise prediction model comprises a machine learning model to predict radio frequency noise received by the one or more wireless antennas.

Example 16 includes the subject matter of Example 15, and wherein to activate the one or more components comprises to execute a predetermined application of the computing device.

Example 17 includes the subject matter of any of Examples 15 and 16, and wherein to monitor the platform activity comprises to read a performance counter of the computing device.

Example 18 includes the subject matter of any of Examples 15-17, and wherein the performance counter comprises a processor performance counter, a memory performance counter, or a graphics processing unit performance counter.

Example 19 includes the subject matter of any of Examples 15-18, and wherein to monitor the platform activity comprises to identify an active application.

Example 20 includes the subject matter of any of Examples 15-19, and wherein to measure the radio frequency noise comprises to identify an affected antenna of the one or more wireless antennas associated with the radio frequency noise.

Example 21 includes the subject matter of any of Examples 15-20, and wherein to measure the radio frequency noise comprises to determine a spectrum of the radio frequency noise.

Example 22 includes the subject matter of any of Examples 15-21, and wherein to measure the radio frequency noise comprises to determine a covariance matrix for the radio frequency noise.

Example 23 includes a method for managing platform noise, the method comprising monitoring, by a computing device, platform activity of the computing device; predicting, by the computing device, a radio frequency noise prediction based on the platform activity using a noise prediction model, wherein the noise prediction model comprises a trained machine learning model; and mitigating, by the computing device, radio frequency noise received by one or more wireless antennas of the computing device based on the radio frequency noise prediction.

Example 24 includes the subject matter of Example 23, and wherein monitoring the platform activity comprises reading a performance counter of the computing device.

Example 25 includes the subject matter of any of Examples 23 and 24, and wherein reading the performance counter comprises reading a processor performance counter, reading a memory performance counter, or reading a graphics processing unit performance counter.

Example 26 includes the subject matter of any of Examples 23-25, and wherein monitoring the platform activity comprises identifying an active application.

Example 27 includes the subject matter of any of Examples 23-26, and wherein predicting the radio frequency noise prediction comprises predicting an affected antenna of the one or more wireless antennas of the computing device.

Example 28 includes the subject matter of any of Examples 23-27, and wherein predicting the radio frequency noise prediction further comprises predicting a wireless antenna location within the computing device for the one or more wireless antennas having a lower radio frequency noise level.

Example 29 includes the subject matter of any of Examples 23-28, and wherein predicting the radio frequency noise prediction comprises predicting a noise profile for the one or more wireless antennas.

Example 30 includes the subject matter of any of Examples 23-29, and wherein predicting the radio frequency noise prediction comprises predicting a covariance matrix for the noise received by a plurality of wireless antennas.

Example 31 includes the subject matter of any of Examples 23-30, and wherein mitigating the radio frequency noise received by the one or more wireless antennas comprises providing the radio frequency noise prediction to a wireless modem of the computing device, wherein the wireless modem is coupled to the one or more wireless antennas.

Example 32 includes the subject matter of any of Examples 23-31, and wherein predicting the radio frequency noise prediction comprises predicting a covariance matrix for the noise received by a plurality of wireless antennas; and mitigating the radio frequency noise further comprises whitening the radio frequency noise by the wireless modem using the covariance matrix.

Example 33 includes the subject matter of any of Examples 23-32, and wherein predicting the radio frequency noise prediction comprises predicting a noise profile for the one or more wireless antennas; and mitigating the radio frequency noise further comprises changing a mode of operation of the wireless modem based on the noise profile.

Example 34 includes the subject matter of any of Examples 23-33, band wherein changing the mode of operation comprises changing from a multiple in, multiple out (MIMO) mode to a single in, single out (SISO) mode.

Example 35 includes the subject matter of any of Examples 23-34, and wherein mitigating the radio frequency noise comprises adjusting a clock frequency of a component of the computing device.

Example 36 includes the subject matter of any of Examples 23-35, and wherein mitigating the radio frequency noise comprises adjusting an application priority to avoid wireless interference.

Example 37 includes a method for platform noise training, the method comprising activating, by a computing device, one or more components of the computing device; monitoring, by the computing device, platform activity of the computing device in response to activating the one or more components; measuring, by the computing device using a wireless modem of the computing device, radio frequency noise received by one or more wireless antennas of the computing device; and training, by the computing device, a noise prediction model based on the platform activity and the radio frequency noise, wherein the noise prediction model comprises a machine learning model to predict radio frequency noise received by the one or more wireless antennas.

Example 38 includes the subject matter of Example 37, and wherein activating the one or more components comprises executing a predetermined application of the computing device.

Example 39 includes the subject matter of any of Examples 37 and 38, and wherein monitoring the platform activity comprises reading a performance counter of the computing device.

Example 40 includes the subject matter of any of Examples 37-39, and wherein reading the performance counter comprises reading a processor performance counter, reading a memory performance counter, or reading a graphics processing unit performance counter.

Example 41 includes the subject matter of any of Examples 37-40, and wherein monitoring the platform activity comprises identifying an active application.

Example 42 includes the subject matter of any of Examples 37-41, and wherein measuring the radio frequency noise comprises identifying an affected antenna of the one or more wireless antennas associated with the radio frequency noise.

Example 43 includes the subject matter of any of Examples 37-42, and wherein measuring the radio frequency noise comprises determining a spectrum of the radio frequency noise.

Example 44 includes the subject matter of any of Examples 37-43, and wherein measuring the radio frequency noise comprises determining a covariance matrix for the radio frequency noise.

Example 45 includes a computing device comprising: a processor; and a memory having stored therein a plurality of instructions that when executed by the processor cause the computing device to perform the method of any of Examples 23-44.

Example 46 includes one or more machine readable storage media comprising a plurality of instructions stored thereon that in response to being executed result in a computing device performing the method of any of Examples 23-44.

Example 47 includes a computing device comprising means for performing the method of any of Examples 23-44.

The invention claimed is:

1. A computing device for managing platform noise, the computing device comprising:
   a graphics processing unit
   a wireless modem coupled to one or more wireless antennas;
   a platform context engine to (i) monitor a performance counter of the graphics processing unit of the computing device and (ii) predict a radio frequency noise prediction based on the performance counter with a noise prediction model, wherein the noise prediction model includes a trained machine learning model; and
   a platform noise manager to mitigate radio frequency noise received by one or more wireless antennas of the computing device based on the radio frequency noise prediction.

2. The computing device of claim 1, wherein to monitor the performance counter, the platform context engine is to identify an active application.

3. The computing device of claim 1, wherein to predict the radio frequency noise prediction, the platform context engine is to predict an affected antenna of the one or more wireless antennas of the computing device.

4. The computing device of claim 1, wherein to mitigate the radio frequency noise received by the one or more wireless antennas, the platform noise manager is to provide the radio frequency noise prediction to the wireless modem of the computing device.

5. The computing device of claim 4, wherein:
to predict the radio frequency noise prediction, the platform context engine is to predict a covariance matrix for the noise received by a plurality of wireless antennas; and
to mitigate the radio frequency noise, the platform noise manager is further to whiten the radio frequency noise by the wireless modem with the covariance matrix.

6. The computing device of claim 4, wherein:
to predict the radio frequency noise prediction, the platform context engine is to predict a noise profile for the one or more wireless antennas; and
to mitigate the radio frequency noise, the platform noise manager is further to change a mode of operation of the wireless modem based on the noise profile.

7. The computing device of claim 1, wherein to mitigate the radio frequency noise, the platform noise manager is to adjust a clock frequency of a component of the computing device.

8. The computing device of claim 1, wherein to mitigate the radio frequency noise, the platform noise manager is to adjust an application priority to avoid wireless interference.

9. The computing device of claim 1, wherein the monitored performance counter of the graphics processing unit includes at least one of a utilization of the graphics processing unit, a number of memory faults of the graphics processing unit, a cache activity of the graphics processing unit, or a processor C1 time of the graphics processing unit.

10. The computing device of claim 1, wherein the performance counter of the graphics processing unit is a first performance counter, the platform context engine is to monitor a second performance counter of the memory of the computing device, and the platform context engine is to predict the radio frequency noise prediction based on the first performance counter and the second performance counter.

11. The computing device of claim 10, wherein the second performance counter includes at least one of an average number of bytes read from a data storage device, a number of memory pages output per second, or a disk queue length for a data storage device.

12. The computing device of claim 1, wherein the performance counter of the graphics processing unit is a first performance counter, and the platform context engine is to monitor a second performance counter of the wireless modem of the computing device.

13. The computing device of claim 12, wherein the second performance counter includes at least one of a number of false alarms, a number of received-packet failures, or a number of retransmissions.

14. One or more non-transitory computer-readable storage media comprising a plurality of instructions that in response to being executed cause a computing device to:
monitor a performance counter of a graphics processing unit (GPU) of the computing device;
predict a radio frequency noise prediction based on the performance counter using a noise prediction model, wherein the noise prediction model includes a trained machine learning model; and
mitigate radio frequency noise received by one or more wireless antennas of the computing device based on the radio frequency noise prediction.

15. The one or more non-transitory computer-readable storage media of claim 10, wherein the instructions, when executed cause the computing device to, in order to mitigate the radio frequency noise received by the one or more wireless antennas, provide the radio frequency noise prediction to a wireless modem of the computing device, wherein the wireless modem is coupled to the one or more wireless antennas.

16. The one or more non-transitory computer-readable storage media of claim 15, wherein the instructions, when executed cause the computing device to:
in order to predict the radio frequency noise prediction, predict a covariance matrix for the noise received by the one or more wireless antennas; and
in order to mitigate the radio frequency noise, whiten the radio frequency noise by the wireless modem using the covariance matrix.

17. The one or more non-transitory computer-readable storage media of claim 15, wherein the instructions, when executed cause the computing device to:
in order to predict the radio frequency noise prediction, predict a noise profile for the one or more wireless antennas; and
in order to mitigate the radio frequency noise, change a mode of operation of the wireless modem based on the noise profile.

18. The one or more non-transitory computer-readable storage media of claim 14, wherein the instructions, when executed cause the computing device to, in order to mitigate the radio frequency noise, adjust a clock frequency of a component of the computing device.

19. The one or more non-transitory computer-readable storage media of claim 14, wherein the instructions, when executed cause the computing device to, in order to mitigate the radio frequency noise, adjust an application priority to avoid wireless interference.

20. A computing device for platform noise training, the computing device comprising:
a graphics processing unit
a wireless modem coupled to one or more wireless antennas;
a training manager to activate one or more components of the computing device;
a platform context engine to:
monitor a performance counter of the graphics processing unit of the computing device in response to activation of the one or more components; and
train a noise prediction model based on the performance counter and the radio frequency noise, wherein the noise prediction model includes a machine learning model to predict radio frequency noise received by the one or more wireless antennas; and
a noise diagnostic tool to measure, with the wireless modem of the computing device, radio frequency noise received by the one or more wireless antennas of the computing device.

21. The computing device of claim 20, wherein to activate the one or more components, the training manager is to execute a predetermined application of the computing device.

22. The computing device of claim 20, wherein to measure the radio frequency noise, the noise diagnostic tool is to identify an affected antenna of the one or more wireless antennas associated with the radio frequency noise.

23. The computing device of claim 20, wherein to measure the radio frequency noise, the noise diagnostic tool is to determine a spectrum of the radio frequency noise.

24. The computing device of claim 20, wherein to measure the radio frequency noise, the noise diagnostic tool is to determine a covariance matrix for the radio frequency noise.

25. One or more non-transitory computer-readable storage media comprising a plurality of instructions that in response to being executed cause a computing device to:
- activate one or more components of the computing device;
- monitor a performance counter of a graphics processing unit of the computing device in response to activating the one or more components;
- measure, using a wireless modem of the computing device, radio frequency noise received by one or more wireless antennas of the computing device; and
- train a noise prediction model based on the performance counter and the radio frequency noise, wherein the noise prediction model includes a machine learning model to predict radio frequency noise received by the one or more wireless antennas.

26. The one or more non-transitory computer-readable storage media of claim 25, wherein the instructions, when executed cause the computing device to, in order to activate the one or more components, execute a predetermined application of the computing device.

27. The one or more non-transitory computer-readable storage media of claim 25, wherein the instructions, when executed cause the computing device to, in order to measure the radio frequency noise, determine a spectrum of the radio frequency noise.

28. The one or more non-transitory computer-readable storage media of claim 25, wherein the instructions, when executed cause the computing device to, in order to measure the radio frequency noise, determine a covariance matrix for the radio frequency noise.

* * * * *